United States Patent [19]
Stone

[11] 3,785,885
[45] Jan. 15, 1974

[54] EPITAXIAL SOLUTION GROWTH OF TERNARY III–V COMPOUNDS

[75] Inventor: Louis Earl Stone, Richardson, Tex.

[73] Assignee: Texas Instruments Incorporated, Dallas, Tex.

[22] Filed: Mar. 24, 1970

[21] Appl. No.: 22,270

[52] U.S. Cl. .......... 148/172
[51] Int. Cl. .......... H01l 7/38
[58] Field of Search .......... 148/1.5, 1.6; 252/62.36 A; 140/177, 171

[56] References Cited

UNITED STATES PATENTS

| | | | |
|---|---|---|---|
| 2,998,334 | 8/1961 | Bakalan et al. | 148/185 X |
| 3,205,101 | 9/1965 | Mlavsky et al. | 148/171 |
| 3,272,591 | 9/1966 | Rudness et al. | 252/62.57 X |
| 3,082,126 | 3/1963 | Chang | 148/1.5 |
| 3,130,040 | 4/1964 | Faust, Jr. et al. | 75/.5 |
| 3,429,818 | 2/1969 | Benedetto et al. | 148/1.6 |
| 3,493,431 | 2/1970 | Wagner | 148/16 |
| 3,551,219 | 12/1970 | Parrish et al. | 148/171 |
| 3,558,373 | 1/1971 | Moody et al. | 148/171 |
| 3,533,856 | 10/1970 | Parrish et al. | 148/171 X |
| 3,560,276 | 2/1971 | Parrish et al. | 148/172 X |
| 3,565,702 | 2/1971 | Nelson | 148/172 |

OTHER PUBLICATIONS

N. H. Ditrick et al., "Design & Fabrication of Germanium Tunnel Diodes", in RCA Engr. Vol. 6, No. 2, Aug.–Sept. 1960, pp. 19–22.

*Primary Examiner*—A. B. Curtis
*Attorney*—Samuel M. Mims, Jr., James O. Dixon, Andrew M. Hassell, Harold Levine, Melvin Sharp, Michael A. Sileo, Jr., Henry T. Olsen, John E. Vandigriff and Gary C. Honeycutt

[57] ABSTRACT

The epitaxial solution growth of ternary III–V compounds, including gallium aluminum arsenide, for example, is controlled to accomplish uniform composition over extended growth periods. In a system comprising (1) a binary III–V compound substrate, (2) a solution of the ternary compound in the Group III element of the substrate, saturated with respect to the substrate compound, and (3) a solid source of the ternary compound in contact with the solution a short distance from the substrate, the necessary control is achieved by maintaining the substrate at least about 5° cooler than the solid source material spaced therefrom.

8 Claims, 9 Drawing Figures

INVENTOR
Louis E. Stone
BY
ATTORNEY

EPITAXIAL SOLUTION GROWTH OF TERNARY III–V COMPOUNDS

This invention relates to the epitaxial solution growth of ternary III–V compounds, and more particularly to methods for controlling said growth to accomplish uniform composition.

The epitaxial solution growth of gallium alluminum arsenide, for example, has previously been accomplished by placing a monocrystalline gallium arsenide substrate in contact with a gallium solution containing aluminum and excess gallium arsenide, and permitting the system to gradually cool from a uniform temperature on the order of 950–1,00° C. Undesirably, however, epitaxial layers produced in a single-step cooling cycle have a graded composition; that is, the initial growth has the highest aluminum arsenide content, while subsequent increments of growth have a progressively decreasing aluminum arsenide concentration, as established by cathodoluminescence.

The fabrication of semiconductor devices from materials having graded compositions can readily be achieved; however, it is far better to provide materials of uniform composition, both from the standpoint of simplifying device manufacture, and because the devices produced have superior characteristics. For example, electroluminescent diodes prepared from the graded material are highly absorptive and admit light only at the device edges, whereas diodes fabricated in the epitaxial layers produced by the present invention generate bright, efficient room temperature emission vertically from the top of the structure.

Accordingly, it is an object of the present invention to provide a method for the epitaxial solution growth of ternary III–V compound layers having uniform composition. In a specific embodiment it is an object of the invention to provide an epitaxial solution-grown layer of gallium aluminum arsenide having uniform composition deposited on a gallium arsenide substrate.

One aspect of the invention is embodied in a method for the epitaxial solution growth of a ternary III–V compound including the step of placing a suitable substrate in contact with a solution containing said ternary compound, saturated with respect to the substrate material. A solid source of substrate material is also placed in contact with the solution, spaced a short distance from the substrate surface. A temperature gradient of at least 1° C. per centimeter is maintained within said solution, increasing with distance from the substrate surface.

For example, a monocrystalline binary III–V compound substrate is placed in contact with a molten body of the Group III element of the substrate compound, said Group III element having dissolved therein an amount of the ternary compound to be grown epitaxially, and also containing an amount of the substrate compound in excess of its solubility therein, so that an undissolved portion thereof remains in equilibrium with the solution, a short distance from the substrate. Preferably, the undissolved material also includes an amount of the ternary compound. A temperature gradient of at least 1° C. per centimeter is maintained within the solution between the substrate and the undissolved portion of the substrate compound, whereby the substrate is kept slightly cooler than the undissolved substrate compound contained in the solution, including the ternary material when present.

As a result of the temperature gradient, the solubility of the substrate compound in the solution will be greater in the vicinity of the undissolved substrate compound than in the vicinity of the substrate itself. A thermally induced transport mechanism is thereby established; i.e., a concentration gradient is produced in the solution, due to the additional increments of the substrate compound that are dissolved in the warmer regions. Then, as the increased concentrations of substrate compound migrate toward the cooler regions of the solution, over-saturation causes "precipitation" to occur in the form of epitaxial growth on the substrate, as desired. The presence of a third element in the solution, and preferably also in the undissolved source material, ensures growth of the ternary compound instead of the binary substrate compound.

In one embodiment, a monocrystalline GaAs substrate is placed in contact with a gallium solution containing gallium aluminum arsenide and saturated with respect to gallium arsenide. An amount of undissolved gallium arsenide and gallium aluminum arsenide is maintained in equilibrium with the solution a short distance from the substrate surface whereon the gallium aluminum arsenide is to be deposited. A temperature gradient of at least 1° C. per centimeter is maintained within the solution by selectively applying heat in the region of the suspended gallium arsenide and gallium aluminum arsenide, whereby the substrate is heated solely by the means of conduction and/or convection currents within the solution itself. A layer of gallium aluminum arsenide of uniform composition is deposited on the substrate.

In $As_xP_{1-x}$, $GaAs_xP_{1-x}$, $Ga_xIn_{1-x}As$, $GaAs_xSb_{1-x}$, $AlAs_xP_{1-x}$, and other examples of ternary III–V compounds are grown in the same manner, on monocrystalline substrates of InAs, GaAs, InAs, GaAs, and AlP, respectively, for example. In each instance, a choice of substrates is available, since the elements of each ternary compound obviously include two binary III–V combinations. In addition to the binary substrates it is equally within the scope of the invention to begin with a ternary substrate.

When reference is made to a source of ternary compound, a pair of binary compounds is also included. For example, a mixture of gallium arsenide and aluminum arsenide is a source of gallium aluminum arsenide; a mixture of gallium arsenide and gallium phosphide is a source of gallium arsenide phosphide; etc.

The distance maintained between the substrate and the separate source of the ternary compound and substrate material is usually from 1 millimeter to about 5 centimeters, preferably from about 0.5 centimeters to 2.0 centimeters. The distance is not critical, but it does affect the growth rate: the greater the distance, the slower the rate.

While the maintenance of a constant substrate temperature and a constant temperature difference between substrate and source material is capable of producing epitaxial layers of uniform composition having a thickness of many microns, (e.g., up to 20 microns) still further modification is required to deposit layers of uniform composition having a thickness greater than 20 microns (e.g., up to 200 microns). Layers of uniform composition having a thickness of at least 100 microns are grown in accordance with a preferred embodiment of the invention wherein the above-described method is further modified to include a programmed temperature increase at a rate of about 0.01° C. to 1.0° C. per minute, while maintaining the indicated temperature difference between the substrate and the source of substrate material spaced from the substrate.

The gradual temperature increase offsets the progressive effect of reducing the proportion of ternary compound in the solution during epitaxial growth. That is, when depositing $Ga_xAl_{1-x}As$ on a GaAs substrate, for example, the AlAs content of the solution is gradually depleted while the GaAs content remains substantially constant. This depletion soon tends to reduce the ratio of Al to Ga in the epitaxial layer, if nothing is done to offset the depletion. A programmed temperature increase solves the problem, since the ratio of Al to Ga in the deposited layer tends to increase with temperature, when additional AlAs is available from the suspended source.

In accordance with another embodiment of the invention, a constant temperature difference is maintained between substrate and source material, as above, while also cooling the entire system by a small increment from time to time, between extended periods of growth without changing the temperature. Each time the system is subjected to a cooling increment, additional source material is provided due to the precipitation of crystallites from the solution.

Figures 1, 2, 3:
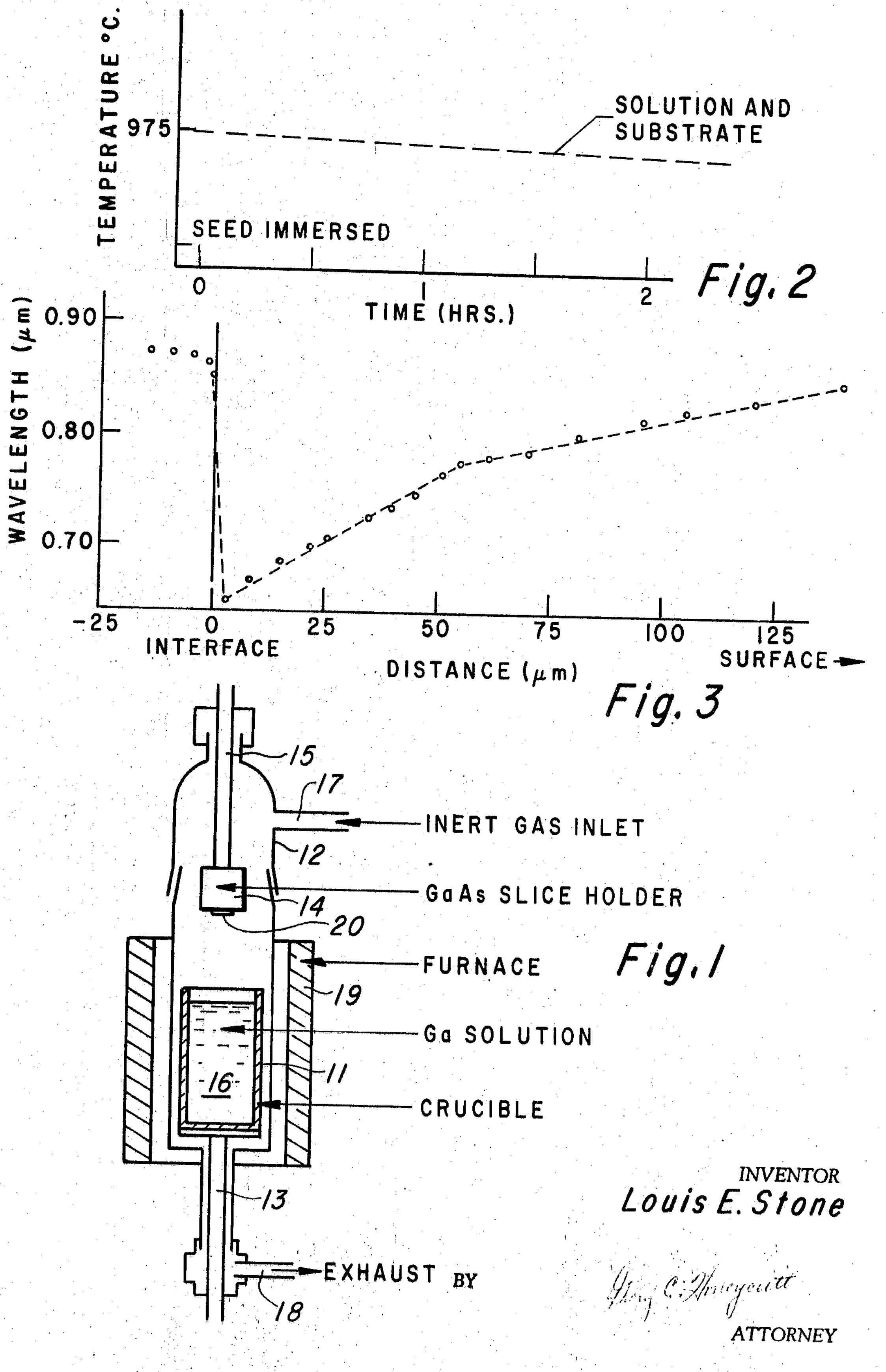
FIG. 1 is a schematic diagram in cross-section of suitable apparatus for use in practicing the invention.
FIG. 2 is a plot of temperature versus time illustrating the prior art practice of growing ternary III–V compound epitaxial layers in a single-step cooling cycle.
FIG. 3 is a plot of epitaxial layer thickness in microns, versus cathodoluminescence wavelength, which is a recognized analytical tool for determining the composition of such layers. It represents the resulting composition of the process of FIG. 2.
Figures 4, 5, 6, 7:
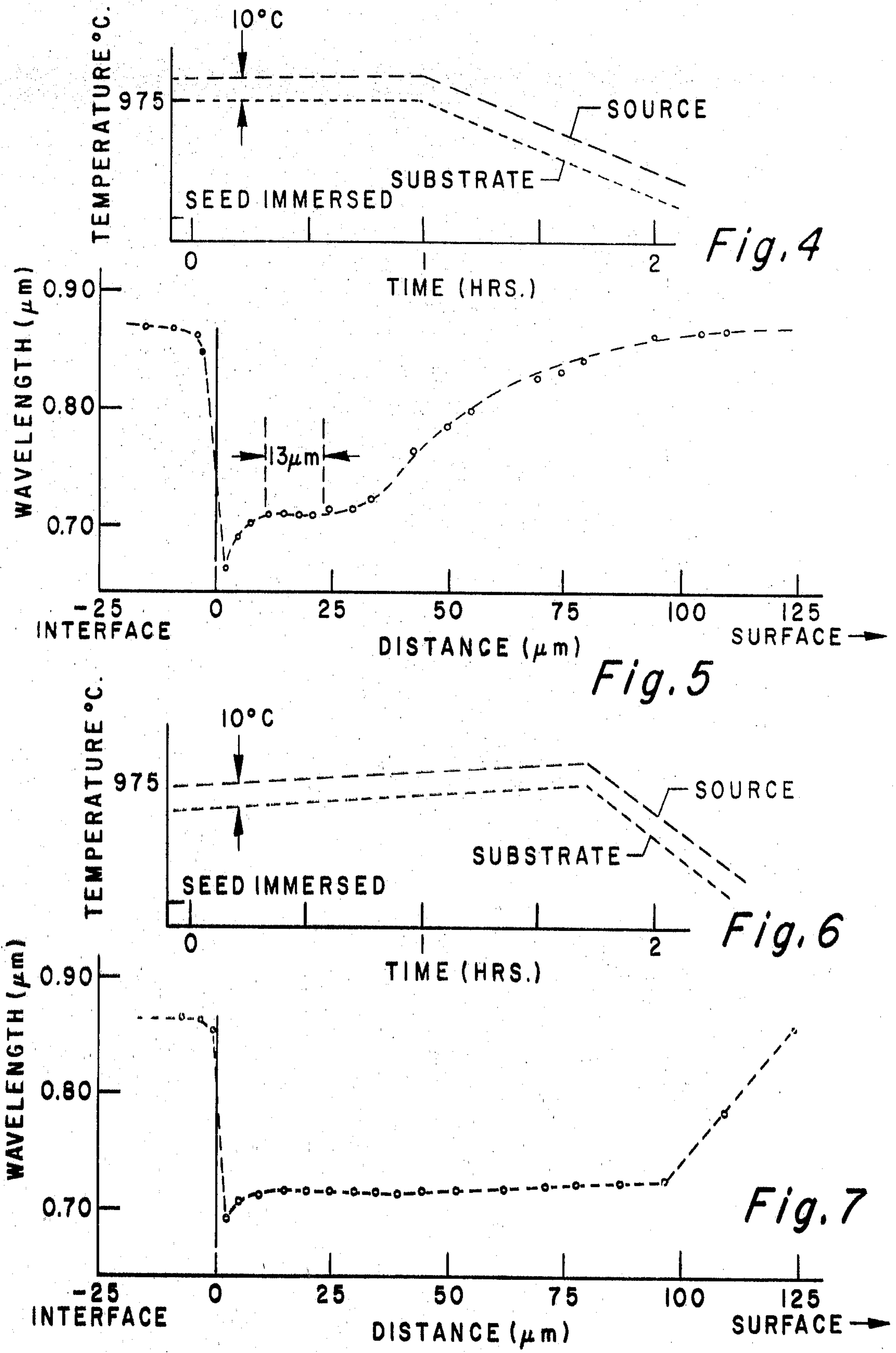
FIG. 4 is a time-versus-temperature plot illustrating one embodiment of the present invention.
FIG. 5 is a cathodoluminescence plot showing the existence of a 13-micron increment of uniform composition in the epitaxial layer produced in accordance with the temperature schedule of FIG. 4.
FIG. 6 is a plot of the temperature schedule required in accordance with a second embodiment of the invention.
FIG. 7 is a cathodoluminescence wavelength plot showing a 100- micron interval of uniform composition in the epitaxial layer deposited using the temperature schedule of FIG. 6.

In FIG. 1, alumina crucible 11 is supported within chamber 12 by means of support member 13. Substrate holder 14 carrying the gallium arsenide substrate 20 is supported within chamber 12 by member 15. Gallium solution 16 consists, for example, of 100 grams of gallium, 30 grams of gallium arsenide, and 0.3 grams of aluminum. This amount of gallium arsenide exceeds the amount required to saturate the gallium; thus, a small amount of gallium arsenide and a small amount of aluminum arsenide remain undissolved in solid form. The system is protected from the atmosphere by means of an inert gas blanket circulated through chamber 12 by means of inlet 17 and exhaust port 18. The system is brought to temperature by means of furnace 19, which includes separately controllable heating elements thereby permitting a temperature gradient to be readily maintained in the solution from the top to the bottom of crucible 11. A temperature difference of about 10° C. is maintained between the substrate and the source of undissolved gallium arsenide plus aluminum arsenide, as illustrated by the schedule of FIG. 4. That is, the substrate slice in holder 14 is maintained at about 975° C. while the source of undissolved gallium arsenide is maintained at about 985° C. At the end of 1 hour the system is allowed to cool, as also indicated in FIG. 4, while the initial temperature difference of 10° C. is maintained between source and substrate. The deposited layer of gallium aluminum arsenide was shown to contain a ratio of aluminum to arsenic of 0.30/0.70 and to provide a cathodoluminescence profile as shown in FIG. 5.

In most cases the excess, undissolved substrate compound is slightly less dense than the molten solution, and therefore floats. Thus, in the system illustrated by FIG. 1, the distance between the substrate and the floating crystallites of GaAs plus AlAs is determined by the depth to which the substrate is immersed below the surface of the gallium solution; and the temperature gradient progresses from higher to lower tempertures with increasing depth.

A separate run was carried out using a gallium solution of the same composition, and with the temperature schedule shown in FIG. 6. That is, beginning with a substrate temperature of 965° C. and a source temperature of 975° C., the 10° C. difference was maintained while increasing the temperature gradually at all points within the system. After a time of about 1 hour and 40 minutes, the temperature of the substrate reached 975° C. and the temperature of the undissolved source material reached a temperature of 985° C., after which the entire system was permitted to cool as shown in FIG. 6. The resulting epitaxial film of $Ga_{0.7}Al_{0.3}As$ exhibited a cathodoluminescence profile as shown in FIG. 7, illustrating an epitaxial layer of uniform composition having a thickness of about 100 microns.

Figures 8, 9:
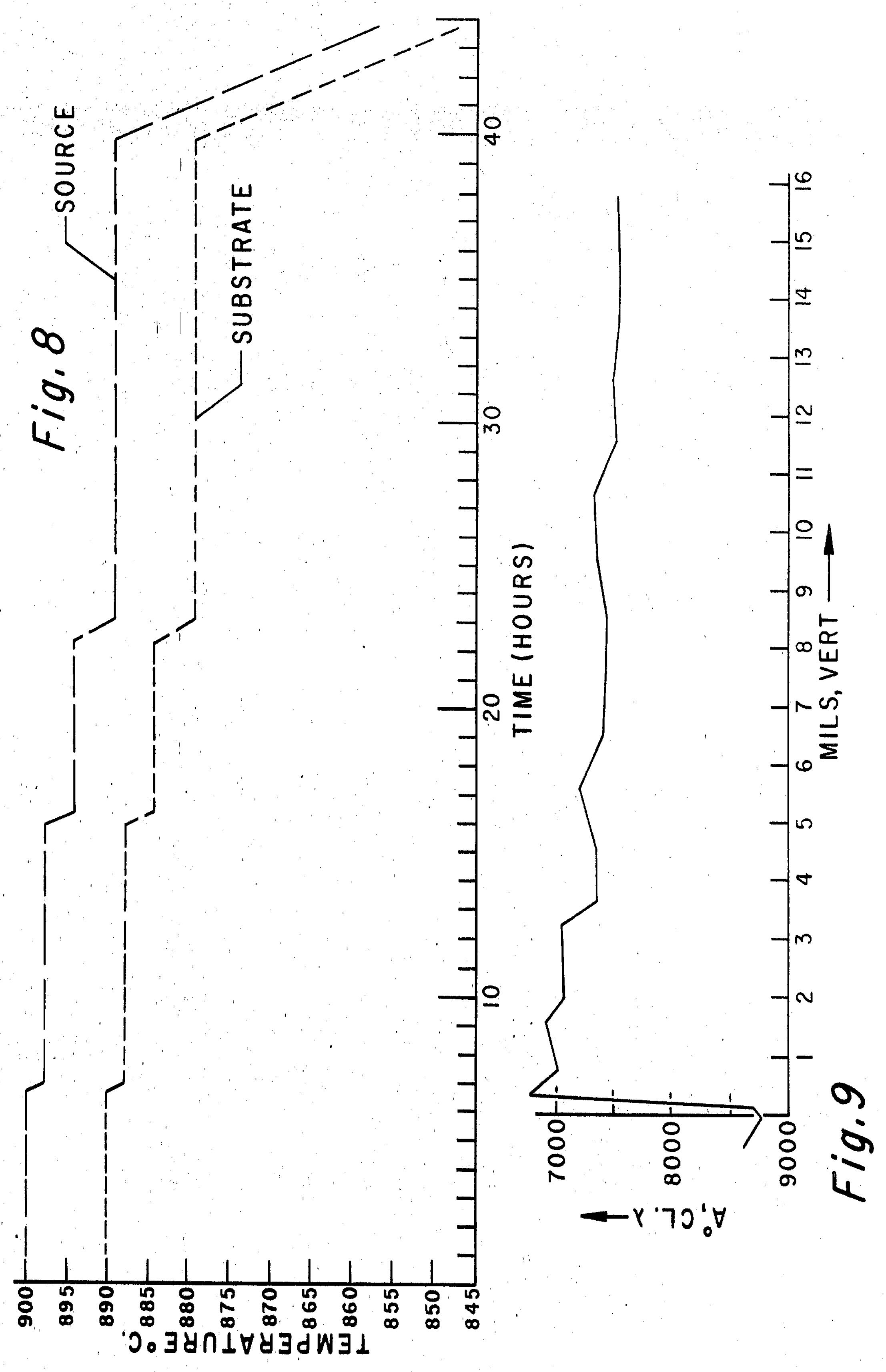
FIG. 8 is a plot of the temperature schedule required in accordance with a third embodiment of the invention.
FIG. 9 is a cathodoluminescence wavelength plot showing small variations in the composition of the 15-mils-thick epitaxial layer deposited using the temperature schedule of FIG. 8.

A similar run was carried out using a gallium solution of the same composition, and with the temperature schedule of FIG. 8. That is, a substrate temperature of 900° C. and a source material temperature of 910° C. were initially maintained for 400 minutes, followed by a 15-minute cooling increment of 2° C., followed by a 540-minute interval of constant temperatures, and then by a second cooling period, etc., as shown in FIG. 8. The resulting epitaxial film ($Ga_{0.7}Al_{0.3}As$) exhibited a cathodoluminescence profile as shown in FIG. 9.

In the embodiment of FIG. 8, the cooling periods are progressively longer, resulting in progressively greater cooling increments, as required in order to cause roughly the same amount of crystallites to form each time, and thereby minimize variations in the composition of the deposited layer. The cooling rate is between 0.01° C. and 1.0° C. per minute, and the cooling increment is preferably at least about 1° C. The duration of each growth period between cooling periods is not critical, and is usually continued until the source material is substantially consumed.

In each embodiment of the invention, a conductivity type determining impurity is preferably included in the molten solution, for the purpose of imparting to the deposited layer a desired conductivity type and resistivity. For example, tellurium is added for n-type conductivity, and Zn for p-type conductivity.

What is claimed is:

1. A method for the epitaxial solution growth of a ternary III–V compound comprising the steps of:

a. immersing a suitable substrate below the surface of a saturated solution of said substrate, said solution also containing said ternary compound in dissolved form, while floating an amount of undissolved substrate material on the surface of said solution, in the form of discrete crystallites spaced a short distance from said substrate; and b. maintaining a temperature gradient of at least 1° C. per cm. within said solution, increasing with distance from the substrate in the direction of said undissolved substrate material.

2. A method as defined by claim 1 wherein said ternary compound is $Ga_xAl_{l-x}As$, said substrate is GaAs, and said solution consists essentially of gallium, aluminum and arsenic plus a suitable dopant.

3. A method as defined by claim 1 wherein the temperature of the system is gradually raised during epitaxial growth, at a rate of about 0.01° C. to 1.0° C. per minute, while maintaining said gradient.

4. A method for the epitaxial solution growth of a ternary III–V compound comprising the steps of:

a. immersing a monocrystalline binary III–V compound substrate below the surface of a saturated solution of said binary compound in the Group III element thereof, said solution containing a minor amount of said ternary compound dissolved therein; while floating on the surface of said solution a source of said binary and ternary compounds in the form of discrete, undissolved crystallites spaced about 1 mm. to 5 cm. from said substrate; and b. maintaining said substrate about 5° to 10° C. cooler than said source.

5. A method as defined by claim 4 wherein the temperature of the system is gradually raised during epitaxial growth, at a rate of about 0.01° C. to 1.0° per minute, while maintaining the substrate cooler than the source.

6. A method as defined by claim 4 wherein said ternary compound is $Ga_xAl_{1-x}As$, said substrate is GaAs, and said solution consists essentially of gallium, aluminum and arsenic, plus a suitable dopant.

7. A method as defined by claim 4 wherein said ternary compound is selected from the group consisting of $Ga_xAl_{1-x}As$, $InAs_xP_{1-x}$, $GaAs_xp_{1-x}$, $Ga_xIn_{1-x}As$, $GaAs_xSb_{1-x}$, and $AlAs_xP_{1-x}$.

8. A method as defined in claim 4 wherein the temperature of the system is lowered slightly after each a plurality of prolonged time periods of growth during which no change in temperature occurs.

* * * * *